US012643677B2

(12) United States Patent
Petry

(10) Patent No.: US 12,643,677 B2
(45) Date of Patent: Jun. 2, 2026

(54) METHOD FOR OPERATING A PASSENGER BOARDING BRIDGE OF AN AIRPORT

(71) Applicant: TK AIRPORT SOLUTIONS, S.A., Mieres (ES)

(72) Inventor: Frederik Petry, Hamburg (DE)

(73) Assignee: TK AIRPORT SOLUTIONS, S.A., Mieres (ES)

( * ) Notice: Subject to any disclaimer, the term of this patent is extended or adjusted under 35 U.S.C. 154(b) by 878 days.

(21) Appl. No.: 17/904,136

(22) PCT Filed: Jan. 21, 2021

(86) PCT No.: PCT/EP2021/051326
§ 371 (c)(1),
(2) Date: Aug. 12, 2022

(87) PCT Pub. No.: WO2021/160402
PCT Pub. Date: Aug. 19, 2021

(65) Prior Publication Data
US 2023/0081313 A1 Mar. 16, 2023

(30) Foreign Application Priority Data
Feb. 12, 2020 (EP) .................................... 20156870

(51) Int. Cl.
B64F 1/305 (2006.01)
(52) U.S. Cl.
CPC .................................... B64F 1/305 (2013.01)
(58) Field of Classification Search
CPC ............................... B64F 1/305; B64F 1/3055
(Continued)

(56) References Cited

U.S. PATENT DOCUMENTS

| | | | |
|---|---|---|---|
| 5,226,204 A | 7/1993 | Schoenberger et al. | |
| 7,669,269 B2 * | 3/2010 | Hutton | B64F 1/3055 |
| | | | 340/686.2 |

(Continued)

FOREIGN PATENT DOCUMENTS

| | | | |
|---|---|---|---|
| AU | 2021219259 A1 * | 9/2022 | B64F 1/305 |
| CN | 1476250 A | 2/2004 | |

(Continued)

OTHER PUBLICATIONS

International Search Report issued in PCT/EP2021/051326, having a mailing date of Mar. 31, 2021.

(Continued)

*Primary Examiner* — Gary S Hartmann
(74) *Attorney, Agent, or Firm* — Dinsmore & Shohl LLP

(57) ABSTRACT

A method for operating a passenger boarding bridge of an airport includes the steps of moving the passenger boarding bridge from one of a retracted position into a docking position, or from the docking position into the retracted position. The method further includes receiving from a bridge operator located at a remote operating workstation, operating instructions that are input to an operating interface of the remote work station, the remote workstation being connected to a remote operation network. The method further includes operating the passenger boarding bridge according to the received operation instructions issued by the bridge operator at the remote operating workstation.

9 Claims, 7 Drawing Sheets

(58) Field of Classification Search
USPC .......................................................... 14/71.5
See application file for complete search history.

(56)                    References Cited

U.S. PATENT DOCUMENTS

| | | | | |
|---|---|---|---|---|
| 7,669,270 | B2 * | 3/2010 | Hutton .................. | B64F 1/3055 |
| | | | | 340/686.2 |
| 2006/0277699 | A1 | 12/2006 | Hutton | |
| 2007/0214585 | A1 * | 9/2007 | Hutton .................. | B64F 1/3055 |
| | | | | 14/73.5 |
| 2011/0227697 | A1 | 9/2011 | Spencer | |
| 2024/0190584 | A1 * | 6/2024 | Dobashi ............... | B64F 1/3055 |

FOREIGN PATENT DOCUMENTS

| | | | |
|---|---|---|---|
| CN | 203311459 | U | 11/2013 |
| CN | 103419944 | A | 12/2013 |
| EP | 2147844 | A2 | 1/2010 |
| JP | 2004161195 | A | 6/2004 |
| JP | 7482330 | B2 * | 5/2024 | .............. B64F 1/305 |
| KR | 19990027983 | A | 4/1999 |
| KR | 20200076268 | A * | 6/2020 |
| KR | 102209264 | B1 * | 1/2021 |
| WO | WO-2014207285 | A1 * | 12/2014 | .............. B64F 1/305 |
| WO | 2020/002405 | A1 | 1/2020 |
| WO | WO-2021224174 | A1 * | 11/2021 | .............. B64F 1/305 |
| WO | WO-2021224306 | A1 * | 11/2021 | .............. B64F 1/305 |

OTHER PUBLICATIONS

Extended European Search Report for priority application No. EP 20156870.6, dated Sep. 7, 2020.

\* cited by examiner

1

METHOD FOR OPERATING A PASSENGER BOARDING BRIDGE OF AN AIRPORT

CROSS REFERENCE TO RELATED APPLICATIONS

This application is a U.S. National Stage Entry of International Patent Application Serial Number PCT/EP2021/051326, filed Jan. 21, 2021, which claims priority to European Patent Application No. DE 20156870.6, filed Feb. 12, 2020, the entire contents of each of which are incorporated herein by reference.

FIELD

The present disclosure generally relates to an method of operating a passenger boarding bridge of an airport.

BACKGROUND

Up to date, operations of passenger boarding bridges is not realizing its full efficiency potential. The prime source of inefficiency comes from underutilization of bridge operators for passenger boarding bridges. Underutilization is a result of substantial waiting times of bridge operators before the start of the docking/undocking procedure, long switching times to move from one passenger boarding bridge to the next and idle times in off-peaks due to staffing needs according to peak times.

Furthermore, bridge operators physically operate at the airport, generally within the secure area of an airport (airside), up to date. Physical presence of staff at the airport, particularly within the airside, creates more administrative work (e.g. access passes and background checks) and constitutes an additional potential safety and security concern.

Below paragraphs explain the source of inefficiency in detail.

Currently, passenger boarding bridges are typically operated manually by bridge operators. The process of operating a passenger boarding bridge usually comprises of the following steps upon arrival of an airplane:

1. Bridge operator is informed in advance about expected arrival time and gate of the airplane.
2. Bridge operator finds his/her way typically either by walking within the terminal building or driving with a car on the apron to the gate.
3. Bridge operator waits for the airplane to arrive and complete taxi in.
4. Bridge operator checks the passenger boarding bridge for correct functioning and safe environment before starting the steering process of the passenger boarding bridge to the airplane.
5. Bridge operator steers the passenger boarding bridge to the airplane by manual inputs via a joystick.
6. Bridge operator prepares the passenger boarding bridge for unboarding of passengers, once the passenger boarding bridge has docked to the airplane.
7. Process completed for the bridge operator as passengers deboard.
8. Bridge operator transfers to the next passenger boarding bridge at the airport for docking or undocking or waits for the next order.

New developments enable automated operations of passenger boarding bridges. In these cases, the process of operating a passenger boarding bridge usually comprises of the following steps upon arrival of an airplane:

1. Bridge operator is informed in advance about expected arrival time and gate of the airplane.
2. Bridge operator finds his/her way typically either by walking within the terminal building or driving with a car on the apron to the gate.
3. Bridge operator waits for the airplane to arrive and complete taxi in.
4. Bridge operator checks the passenger boarding bridge for correct functioning and safe environment before starting the steering process of the passenger boarding bridge to the airplane.
5. Bridge operator activates the automatic steering of the passenger boarding bridge to the airplane by e.g. pushing a button. The passenger boarding bridge approaches the airplane without manual inputs from the bridge operator.
6. Bridge operator prepares the passenger boarding bridge for unboarding of passengers, once the passenger boarding bridge has docked to the airplane. Preparation of the passenger boarding bridge can also occur automatically.
7. Process completed for the bridge operator as passengers deboard.
8. Bridge operator transfers to the next passenger boarding bridge at the airport for docking or undocking or waits for the next order.

In case of departure of an airplane, the process typically comprises of the following steps for manual operations:

1. Bridge operator is informed in advance about expected departure time and gate of the airplane.
2. Bridge operator finds his/her way typically either by walking within the terminal building or driving with a car on the apron to the gate.
3. Bridge operator waits for boarding completed.
4. Bridge operator checks the passenger boarding bridge for correct functioning and safe environment before starting the steering process of the passenger boarding bridge away from the aircraft; additionally bridge operator awaits confirmation from apron ground coordinator.
5. Bridge operator steers the passenger boarding bridge away from the airplane by manual inputs via a joystick.
6. Bridge operator prepares the passenger boarding bridge for non-operations, once the passenger boarding bridge is back into rest position.
7. Process completed for the bridge operator.
8. Bridge operator transfers to the next passenger boarding bridge at the airport for docking or undocking or waits for the next order.

For automated operations upon departure of an airplane, the process usually comprises of the following steps:

1. Bridge operator is informed in advance about expected departure time and gate of the airplane.
2. Bridge operator finds his/her way typically either by walking within the terminal building or driving with a car on the apron to the gate.
3. Bridge operator waits for boarding completed.
4. Bridge operator checks the passenger boarding bridge for correct functioning and safe environment before starting the steering process of the passenger boarding bridge away from the airplane additionally bridge operator awaits confirmation from apron ground coordinator.
5. Bridge operator activates the automatic steering of the passenger boarding bridge away from the airplane by e.g. pushing a button. The passenger boarding bridge steers away from the airplane without manual inputs from the bridge operator.

6. Bridge operator prepares the passenger boarding bridge for non-operations, once the passenger boarding bridge is back into rest position. Preparation of the passenger boarding bridge can also occur automatically.

7. Process completed for the bridge operator.

8. Bridge operator transfers to the next passenger boarding bridge at the airport for docking or undocking or waits for the next order.

First problem: Bridge operators spend a substantial amount of their time non-productively either waiting for the next order to arrive or transferring to the next passenger boarding bridge for operations (see Step 8 as described) or waiting for the airplane to arrive and complete taxi in or waiting for boarding completed (see Step 3 as described). This non-productive work time cannot be used efficiently by executing required operations at a different airport up to date as bridge operators are not able to switch to a different airport during these periods quickly.

Second problem: The current processes also require physical presence of bridge operators at the airport. Bridge operators are located physically at the airport and perform docking and undocking operations at that specific airport. Physical presence of bridge operators at an airport leads to administrative complexity as bridge operators typically operate within the airside. For staff access to the airside, special access passes and background checks are required from the authorities creating additional administrative work.

Furthermore, physical presence, in particular within the airside, creates safety and security concerns as every additional person within this area constitutes a potential safety and security risk. Security risks are minimized if fewer people have access to the airside. Safety risks are minimized if fewer people participate physically in on-site operations, e.g. driving cars on the apron.

The extent of first Problem is significant as airports have to plan bridge operator requirements according of peak times. As airports often operate in peak/off-peak times due to a so-called "wave system", bridge operators face times of high utilization during certain times of the day whereas suffering from low utilization during other times of the same day. The problem is even worsened by seasonal fluctuations in flight movements with more traffic typically in summer compared to winter.

Across the airport system, the scenario is likely that one airport faces a temporary high number of flight movements during peak time with utilization of bridge operators at the maximum while, simultaneously, a different airport e.g. in a different time zone, with a different wave system or a tight night curfew, still has utilization of bridge operators at low levels.

FIG. 1 exemplifies the current situation. Airport A requires 20 bridge operators for shift 1. Airport B requires 19 bridge operators for shift 1. For shift 2, Airport A requires 16 bridge operators, Airport B requires 18 bridge operators.

CN 1476250 discloses a system for operating a plurality of passenger boarding bridges from a central duty room within the airport. Only one person sitting in the duty room is responsible for the operation of all passenger boarding bridges within the airport (see also below the description of FIG. 2).

However there are a lot of regional airports with limited traffic. For example at Asturias Airport, Spain there are merely three passenger boarding bridges located in close relationship and there are times, in which merely one aircraft is landing or departing per hour. So due to low utilization of the passenger boarding bridges it does not make a big difference in effectivity, whether the one person is sitting in one central duty room or walking between the passenger boarding bridges.

Thus a need exists for an improved system and/or method of operating passenger boarding bridges.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a method of operating a passenger boarding bridge of an airport.

Figure 2:
FIG. 2 is a top schematic view of an exemplary embodiment of an airport according to the prior art.
Figure 2:
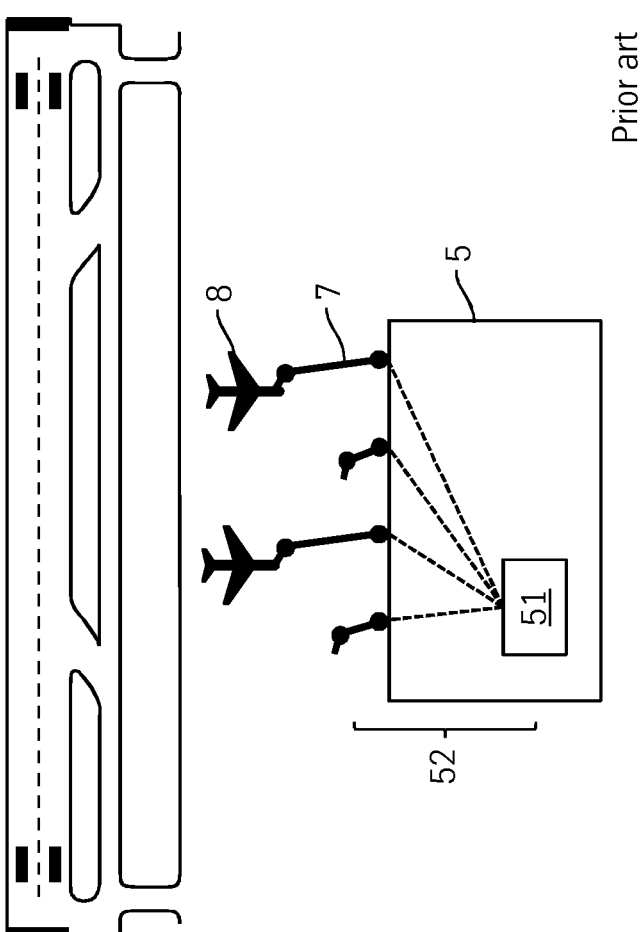

FIG. 2 shows an airport 1 having a terminal building 5. Attached to the terminal building 5 several passenger boarding bridges (PBB) are provided, each for connecting a parked aircraft 8 to the terminal building 5.

Within the terminal building a central duty room 51 is provided, Here a person is located which operates a remote control operating device, as disclosed in CN1476250. A local area network 52 within the airport 1 is provided for transmitting control signals between the central duty room 51 and the passenger boarding bridges 7.

Figure 3:
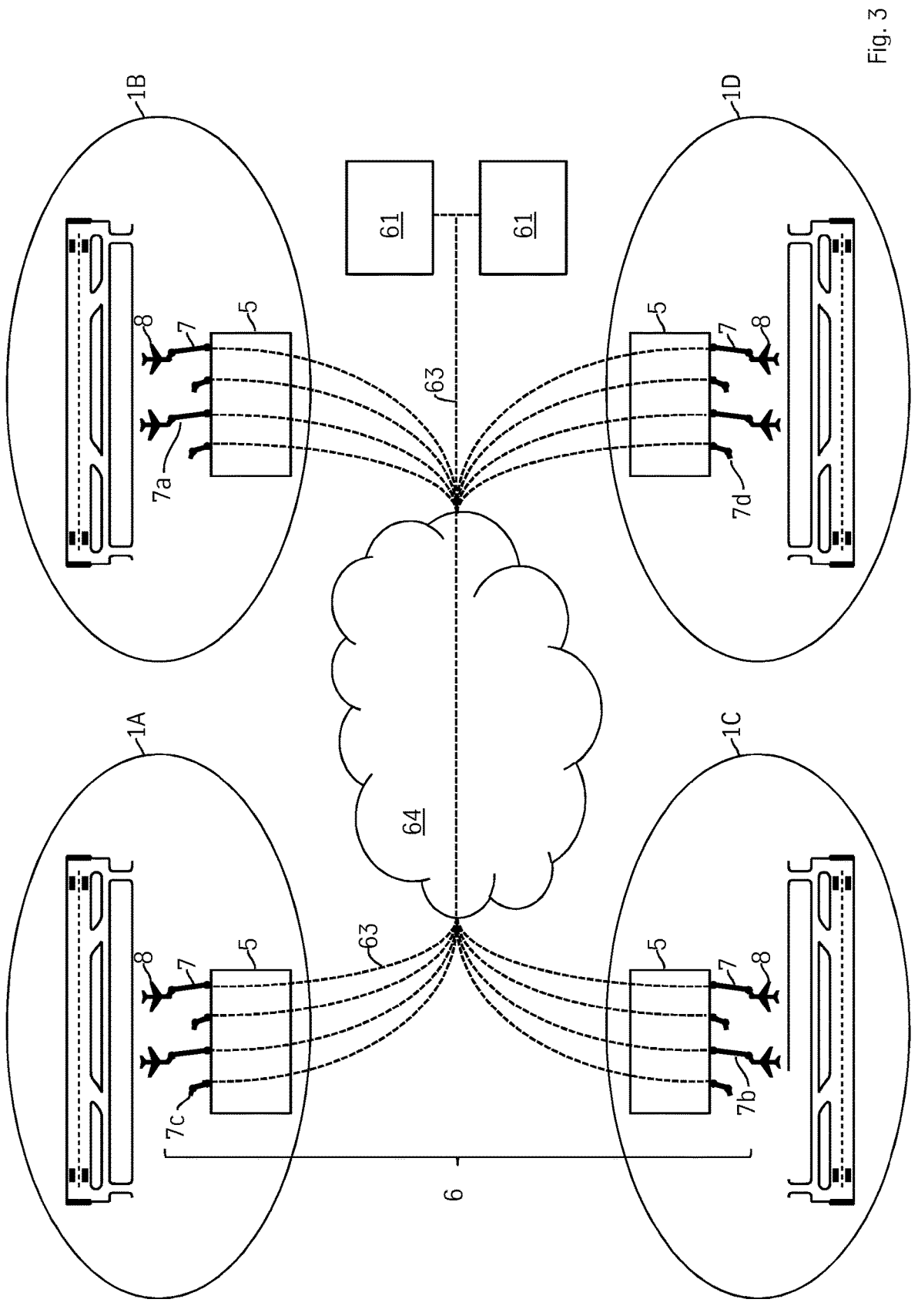
FIG. 3 is a top schematic view of an exemplary embodiment of a plurality of airports, in which the passenger boarding bridges at each respective airport are all connected via a remote operating network, as disclosed herein.

FIG. 3 shows a multi airport network 6 according to the present invention. A plurality of airports 1 are involved. The passenger boarding bridges 7 of all involved airports 1 are connected by a remote control network 6 to a remote operations center 61.

The invention proposes in particular the provision of a remote operating network 6 having location-independent remote operations center 61 for operations of passenger boarding bridges 7. Such a remote operations center 61 consolidates the operations of passenger boarding bridges from multiple airports 1 at one place. This place could be an airport but could also some remote, off-airport location. The solution solves the problems with a number N of airports 1 operating passenger boarding bridges 7 remotely via the remote operations center 61, whereby N is equal or greater than 1. N is not limited and the remote operations center 61 can operate the passenger boarding bridges 7 from multiple airports 1 at completely different locations worldwide.

In an embodiment the passenger boarding bridges 7 are connected to the remote operations center via a network connection 63 which in particular allows real-time replication of the apron environment at the remote operations center 61. The network connection 63 can use the internet 64 for establishing connections over a large distance.

Figure 5:
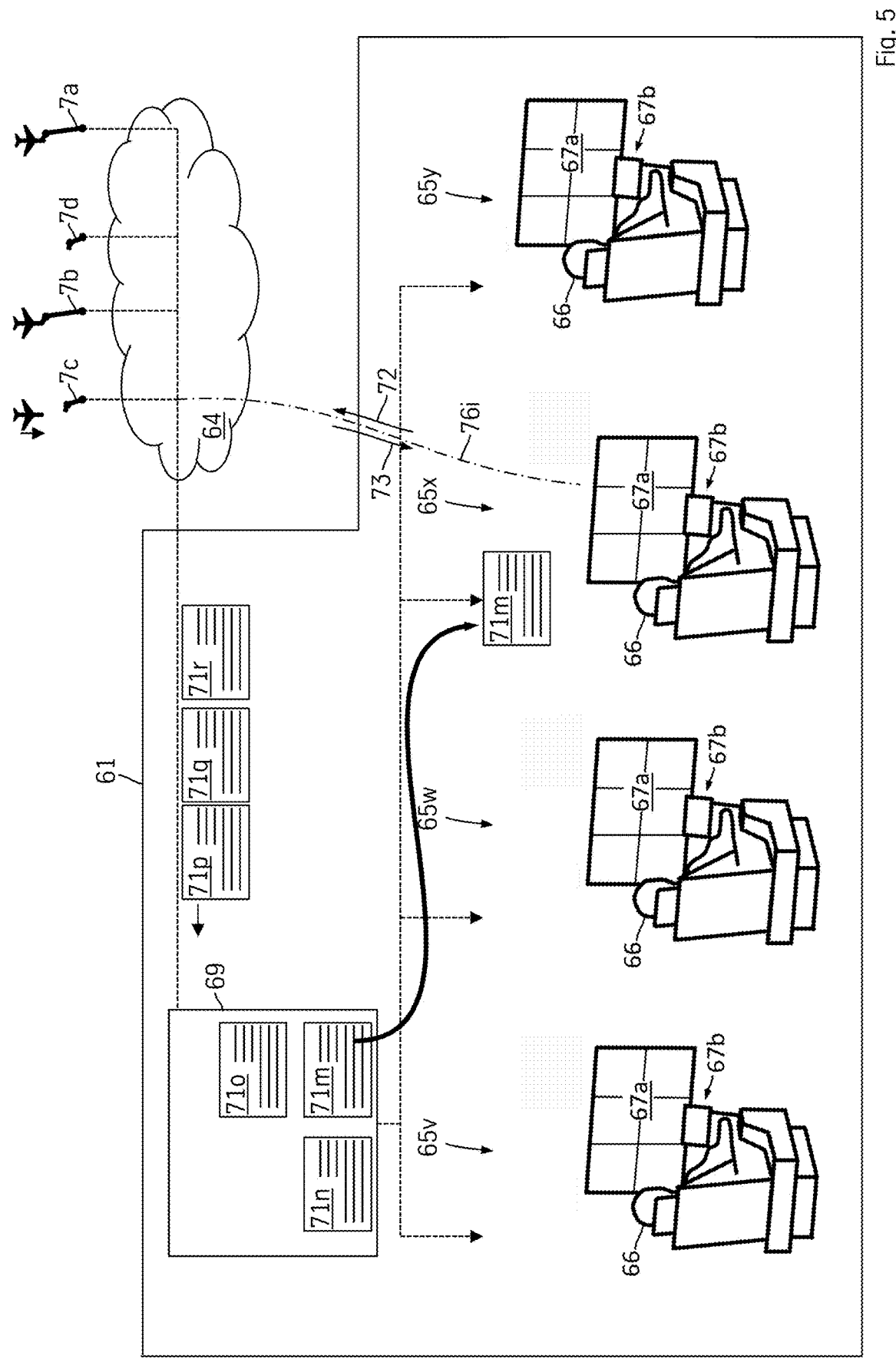
FIG. 5 is a schematic diagram of an exemplary embodiment of a remote operating network during a first situation, as disclosed herein.

FIG. 5 shows the remote operation center 61. Here at least one or a plurality of remote control workstations 65 are provided. At each remote operating station 65 an operator 66 is present to give operation instructions to one of the passenger boarding bridges 7 via the network connection 63.

Two basic technological approaches can be differentiated to operate the passenger boarding bridge 7 remotely:
  1. Remote control technology (Enabler technology 1),
  2. Automated docking/undocking technology (Enabler technology 2).

With the remote control technology (Enabler technology 1), the bridge operator controls the movement of passenger boarding bridges remotely via manual inputs from a joystick or other input means. Here the individual movements of the PBB are influenced by the operators input.

With the automated docking/undocking technology (Enabler technology 2), the bridge operator operates the passenger boarding bridge 7 by manual start of the procedure but without manual control inputs during the steering process. The individual movements of the PBB 7 are calculated by a drive controller and are not influenced by an operators input.

In an embodiment enabler technologies 1 and 2 can be combined in one PBB. For example enabler technology 1 can be used for docking, and enabler technology 2 can be used for undocking.

The passenger boarding bridges 7 are typically equipped with cameras to project a live view of the apron (incl. the passenger boarding bridge) to the bridge operator 66 as illustrated in FIG. 5. A suitable technology supporting this functionality is described in PCT/EP2019/071239 (not published yet). The operator 66 in the remote operations center 61 typically sits in front of a screen 67 with a realistic view of the situation at the passenger boarding bridge and sufficient situational awareness for remote operations. In case of the application of automated docking/undocking technology (see Enabler technology 2), cameras and a live view of the apron may not needed as the situational awareness is covered by the technology.

The method of docking/undocking a passenger boarding bridge via a remote operations center comprises the following steps:

1. The bridge operator is informed about the required docking/undocking of a passenger boarding bridge (operating request). Multiple options exist in order to transmit this information to the remote operations center 61. The exact choice of a method depends on airport and airline requirements and, thus, can be different from airport to airport and even from terminal to terminal and airline to airline. The following list is non-exhaustive:

Call from the gate staff to the remote operations center.

Message from the gate staff to the remote operations center, such as SMS.

Remote operations center 61 has a live view of airport arrivals/departures via link to the Airport Operational Database or other sources (e.g. live tracking via the internet). The need for a docking/undocking procedure is verified by visual check via cameras (see if the airplane has taxied in and come to a complete stop; see if passengers have completed boarding).

There are a plurality of options for triggering a request of starting of the undocking/docking procedure. E.g. a push button in the passenger boarding bridge or at the gate transmits a signal to the remote operations center when being pressed that the docking/undocking procedure is requested and can start. Also two buttons are possible, one for a signal regarding docking and one for a signal regarding undocking. Other possibility is: 1. a PBB key selector is put in remote position option; 2. A confirmation button placed in the rotunda that no one is in the PBB is pressed; 3. A confirmation button placed in the column (at apron level) that apron level is free, is pressed.

2. Operator 66 switches on the passenger boarding bridge by selecting the right passenger boarding bridge at the right airport via a screen.

3. Operator 66 checks whether the environment around the passenger boarding bridge is safe and the passenger boarding bridge is functioning correctly.

4. Operator 66 starts the docking/undocking maneuver by either manual inputs in case of enabling technology 1 or initiating the automated docking/undocking process by e.g. pressing a button.

5. Once the passenger boarding bridge is docked to/undocked from the airplane, the Operator 66 prepares the passenger boarding bridge with remote manual inputs for deboarding or checks whether the required actions are performed in case of automated preparations. After undocking, the operator 66 ensures that the passenger boarding bridge is back in rest position and prepared for non-operations.

6. Once completed, the operator 66 switches off the connection from the passenger boarding bridge and transfers to the next passenger boarding bridge which can be located at a different airport.

In case that the operator 66 is unable to connect to a passenger boarding bridge from the remote operations center 61, multiple options exist. The following list is non-exhaustive: —Message from the bridge operator to the airport where qualified back-up bridge operators will perform the operations manually until the problem is fixed.

Operations from a different remote post until the problem is fixed.

Operations from a different remote operations center until the problem is fixed.

With N=1, the remote operations center solves the described problems from Problem set 2. The remote operations center does not require physical presence of bridge operators 66 at an airport. Therefore, less administrative complexity is required to manage staff access to critical areas. Safety and security concerns are diminished as bridge operators are not physically within the airside and do not participate physically in on-site operations. N=1 solves the described problems from Problem set 1 partially. With the remote operations center for one airport, the non-productive time of transferring from one passenger boarding bridge to another at the same airport is eliminated. Bridge operators 66 can immediately switch to the next passenger boarding bridge without the necessity to walk to the next gate or drive there by car or alternative moving devices.

With N>1, the remote operations center solves all described problems from Problem set 1 & 2. The solutions as depicted for N=1 apply for N>1 as well. In addition, the remote operations center allows bridge operators to operate passenger boarding bridges at different airports. This possibility enables a higher utilization of bridge operators as a bridge can shift to operations at a different airport in case of idle times at another airport.

Figure 1:
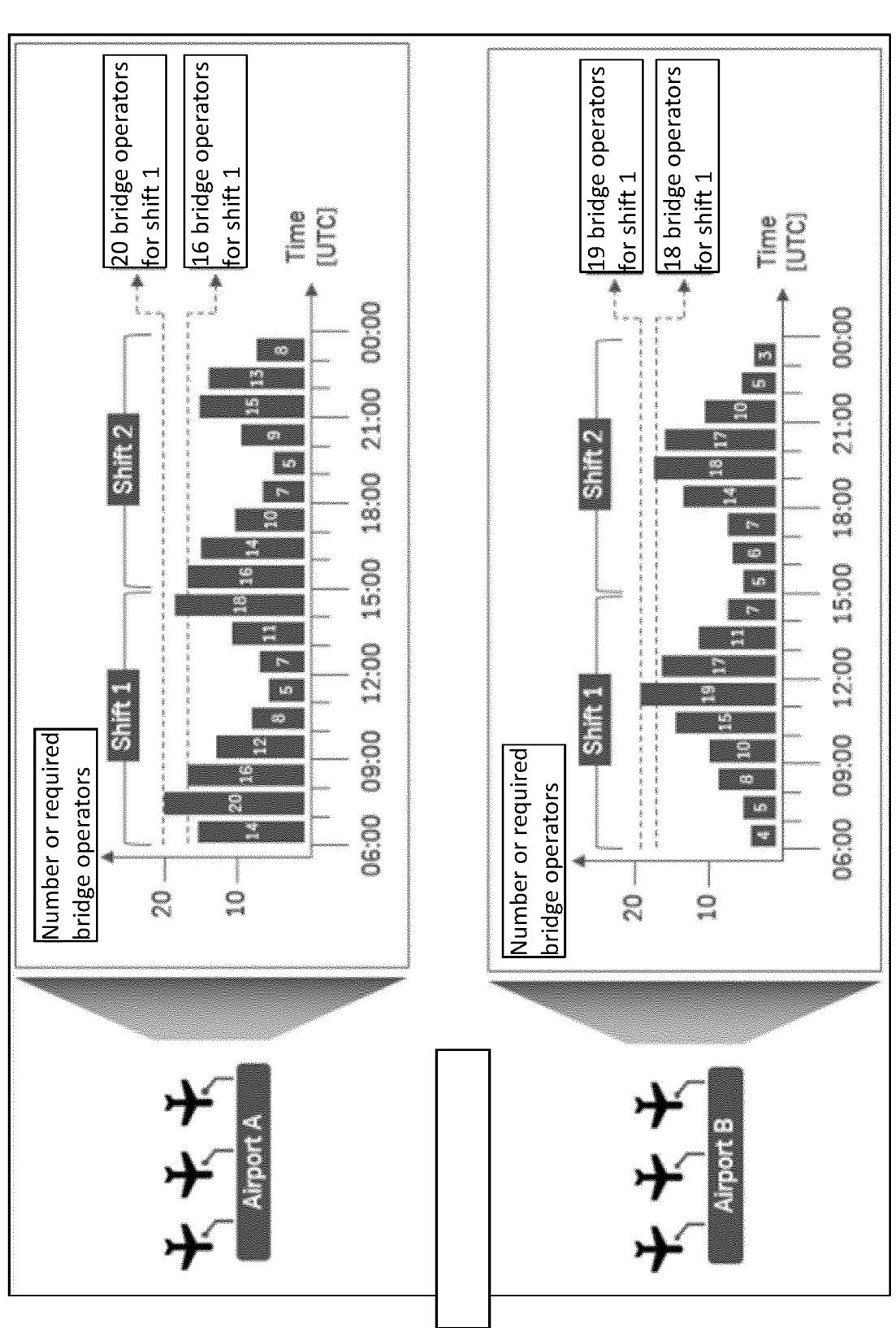
FIG. 1 is a schematic diagram showing an exemplary number of bridge operators that are required to operate passenger boarding bridges at different times throughout the day, at different airports, on any given day.
Figure 4:
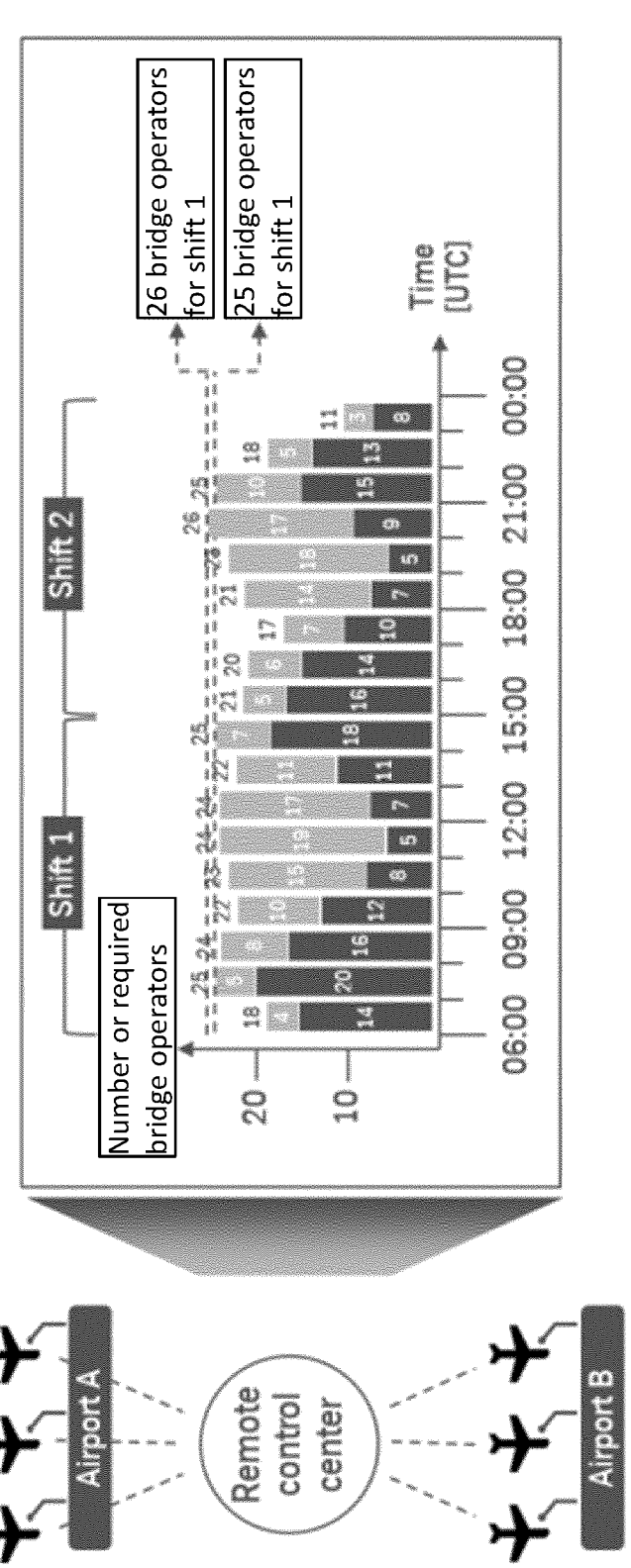
FIG. 4 is a schematic diagram showing an exemplary embodiment of a number of bridge operators that are required at airports for which their passenger boarding bridges are all connected via the remote operating network, as disclosed herein.

FIG. 4 illustrated the concept with the aforementioned examples. Consolidating the operations of passenger boarding bridges of Airport 1A and Airport 1B allows for staffing of bridge operators according to the consolidated peak demand of both airports. Airport A faces peak demand during different times than Airport B. The consolidated peak demand of 25 bridge operators for shift 1 and 26 bridge operators for shift 2 is substantially lower compared to the individual peak demand of both airports (39 for shift 1, thereof 20 for Airport A and 19 for Airport B; 34 for shift 2, thereof 16 for Airport A and 18 for Airport B, see FIG. 1).

Figure 6:
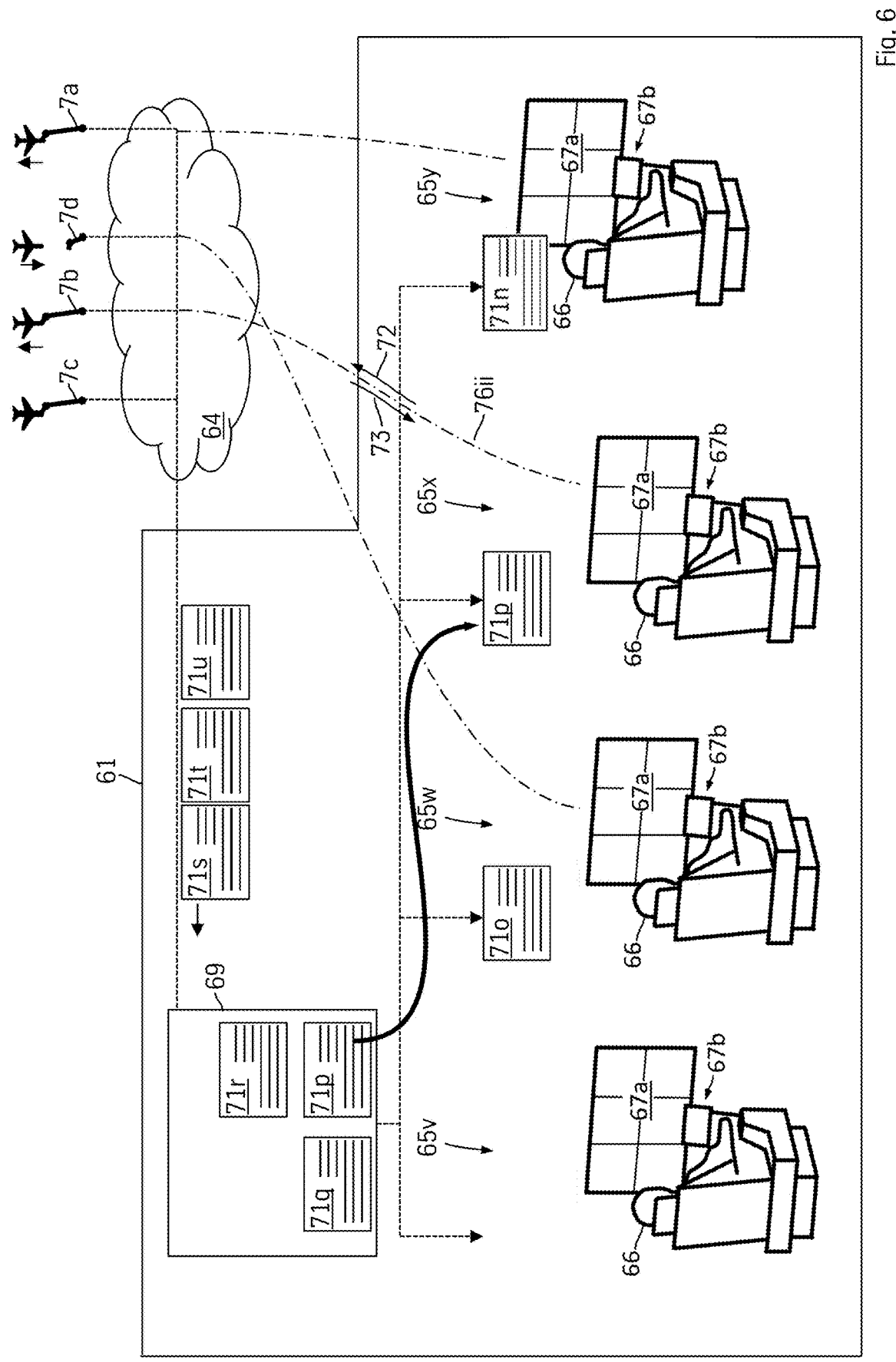
FIG. 6 is a schematic diagram of an exemplary embodiment of a remote operating network during a second situation, as disclosed herein.
Figure 7:
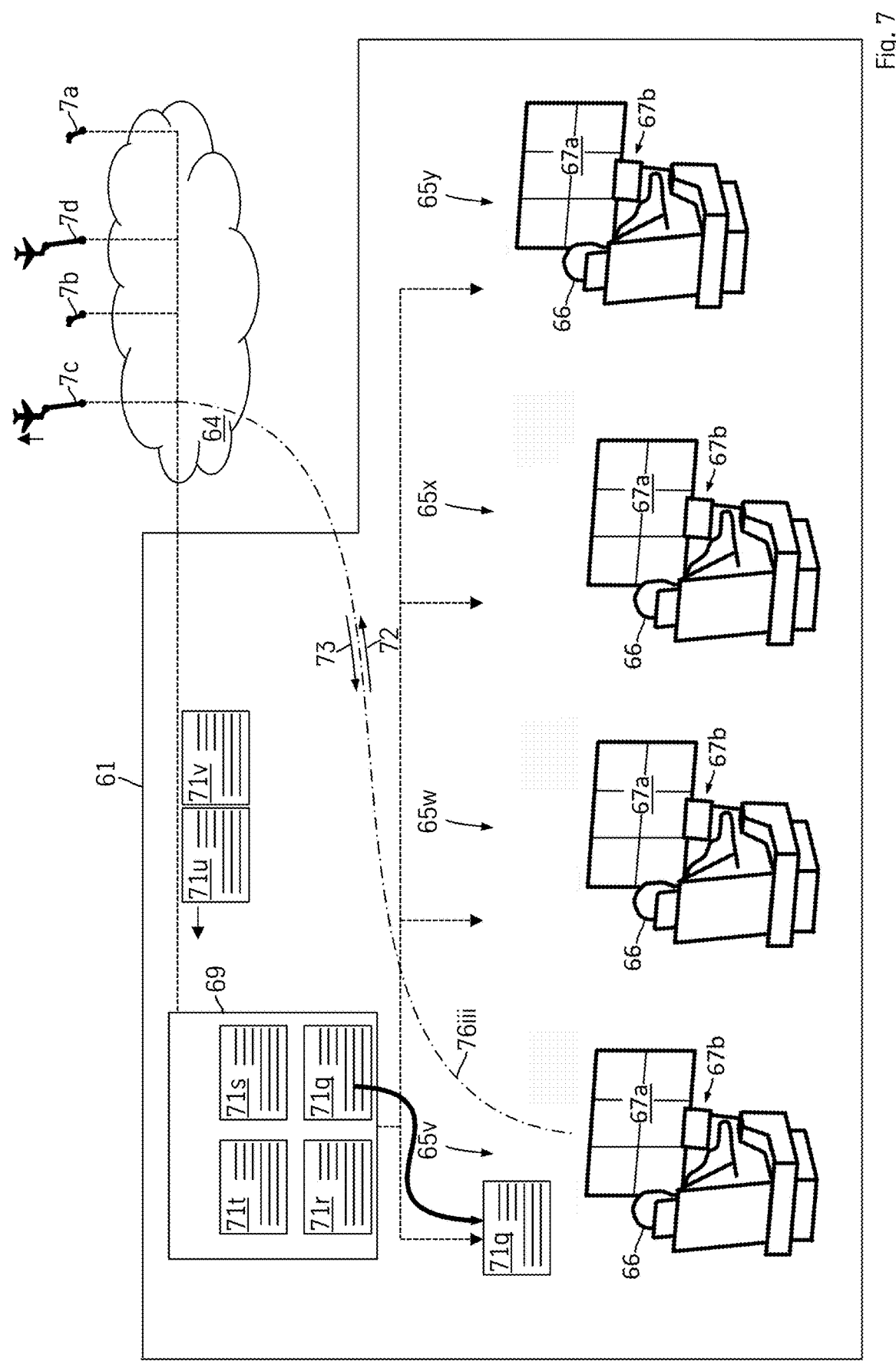
FIG. 7 is a schematic diagram of an exemplary embodiment of a remote operating network during a third situation, as disclosed herein.

With the help of FIGS. 5 to 7 the organization of the network is described.

In the remote operations center 61 a plurality of remote operations workstations 66 are provided. It is merely an example that the remote operations workstations 66 are located in one common remote operations center 61; in an embodiment it is possible, that the remote operations workstations 66 are distributed over a plurality of remote operations center 61. In more decentralized embodiment a remote operations workstations 66 can be located at a home office of the bridge operator, where the home of the operator represents the remote operations center 61.

The bridge operator 66 is in particular a person.

The exemplary passenger boarding bridges 7a-7c of FIGS. 5 to 7 are located at different airports as shown in FIG. 3. According to the situation of FIG. 5 an aircraft is arriving at passenger boarding bridge 7c; consequently the passenger boarding bridge 7c requests a docking operation. According to the situation of FIG. 6 an aircraft is departing from passenger boarding bridge 7b; consequently the passenger boarding bridge 7b requests an undocking operation.

When an individual passenger boarding bridge is to be operated, an operating request 71 is issued. The operating request are received by an allocator 69. The allocator 69 allocated the request to a selected workstation.

According to the situation of FIG. 5 a first passenger boarding bridge 7c is to be docked to the arriving aircraft. A respective first operation request 71m is issued and allocated to a first workstation 65x. A first operating connection 76i is temporarily established so that operating instructions 72 from the workstation to the PBB and operating information from the PBB to the workstation can be transmitted.

During allocation it is to be considered that an operator needs to be certified for operating a certain kind of PBB. So each operator or linked to one or more certificate, where the certificates allows the operator to operate a certain PBB. The allocator takes the certificates into consideration when allocating the request to a certain workstation.

In principle the term allocator is to be understood broadly. The allocator can explicitly allocate a request to a certain operator; however the user is registered at a certain workstation so consequently by allocating the request to a certain operator sitting at a specific workstation the request is allocated to the individual workstation.

In the situation of FIG. 6, the docking procedure of the first passenger boarding bridge 7c is finished and the first operating connection 76i is terminated. Now a second operating request 71p is allocated to the same first workstation 65x. According to the second operating request a second passenger boarding bridge, located at a different airport than the first passenger boarding bridge, has to be undocked from a departing aircraft. Therefore a second operating connection 76ii is temporarily established between the first workstation 65x and the second passenger boarding bridge (7b).

In the situation of FIG. 7, the undocking docking procedure of the second passenger boarding bridge 7b is finished and the second operating connection 76ii is terminated. Now a third operating request 71q is allocated to a second workstation 65v. According to the third operating request 71q the first passenger boarding bridge, which was previously docked by from the first workstation 65x, has to be undocked from the previously docked aircraft. Therefore a third operating connection 76iii is temporarily established between the second workstation 65v and the first passenger boarding bridge (7c).

In some embodiments the gate on which the Passenger boarding bridge is located, comprises more than one centerlines on which the aircraft can be parked (see e.g. PCT/EP2019/076428 containing also a definition of a MARS stand). In this case, information is provided to the workstation on which centerline out of plurality of centerlines is parked. This information can be provided within the operating request.

In embodiment the request is linked to further background information regarding the actual docking/undocking situation. This background information is considered to be as part of the operating request even if the initial information provided to the allocator does not contain this information; the background information may contain data regarding the aircraft to be docked, the parking position on the centerline, a selected centerline out of a plurality of centerlines in a MARS stand.

LIST OF REFERENCE SIGNS 1 airport
5 terminal building
6 remote operating network
7 Passenger boarding bridge
8 aircraft
51 central duty room
52 local area network
61 remote operations center
62 local PBB control unit
63 network connection
64 internet
65 remote operating workstation
66 bridge operator
67 operating interface 67a screen
67b input element
69 allocator
71 operating request
72 operating instruction
73 operating information
76 temporarily established operating connection

What is claimed is:

1. A method of operating a passenger boarding bridge of an airport, comprising:

providing a remote operation network to which is connected at least one remote operation workstation having an operating interface;

receiving a first operation request to remotely operate a first passenger boarding bridge that is located at a first airport;

allocating the received first operation request to a first workstation from a plurality of workstations, thereby establishing a first temporary operating connection between the selected first workstation and the first passenger boarding bridge;

operating the first passenger boarding bridge from the selected first workstation according to the allocated first operation request;

receiving, in the operating interface of the operation workstation, operation instructions issued by a bridge operator located at the remote operating workstation; and remotely operating the passenger boarding bridge according to the received operations instructions to move the passenger boarding bridge from at least one of a retracted position to a docking position, or from the docking position to the retracted position.

2. The method of claim 1, further comprising:

transmitting operation information from the passenger boarding bridge to the remote operation workstation; and presenting the operation information via the operating interface to the bridge operator at the remote operation workstation.

3. The method of claim 1, wherein the remote operation workstation is remotely located a distance of at least 50 km away from the airport, and/or wherein at least one of the operation information or the operations instruction is transmitted between the airport, having the passenger boarding bridge to be controlled, and the workstation remotely located a distance of at least 50 km away from the airport.

4. The method of claim 1, further comprising:

terminating the first operating connection to the first passenger boarding bridge at the first airport after operating the first passenger boarding bridge according to the allocated first operation request;

allocating a second operation request for operating a second passenger boarding bridge located at a second airport to the first workstation, thereby establishing a second temporary operating connection between the first selected workstation and the second passenger boarding bridge; and operating the second passenger boarding bridge from the selected first workstation according to the allocated second operation request.

5. The method of claim 1, wherein during operating according to the allocated first operation request, the first passenger boarding bridge is docked to an arriving aircraft, the method further comprising:

receiving a third operation request for operating the first passenger boarding bridge; allocating the received third operation request to a third workstation selected from the plurality of workstations, the third workstation being different than the first workstation, thereby establishing a third temporary operating connection between the third workstation and the first passenger boarding bridge; and operating the first passenger boarding bridge from the selected third workstation according to the allocated third operation request, to undock the first passenger boarding bridge from a departing aircraft.

6. The method of claim 1, further comprising:

determining which of the plurality of workstations to choose as the first workstation to which the first operation request will be allocated, based on operation parameters of the remote operating network.

7. The method of claim 6, wherein said determining step is further based on individual certifications held by each operator logged into each of the plurality of workstations.

8. The method of claim 5, further comprising:

providing information to the first workstation regarding which centerline, from a plurality of available centerlines, at which the aircraft is parked, to which aircraft the passenger boarding bridge must be docked.

9. A remote operations network, comprising:

a plurality of first passenger boarding bridges located at a first airport;

a plurality of second passenger boarding bridges located at a second airport;

a plurality of remote operating workstations, located remotely to at least one of the airports;

a network connection in operative communication between the plurality of first passenger boarding bridges, the second passenger boarding bridges, and the plurality of remote operating workstations that is configured to enable the transfer of operating data between the plurality of first and second passenger boarding bridge and the plurality of remote operating workstations; and an allocator configured to allocate a plurality of operation requests, each received for operating one of a plurality of passenger boarding bridges, to a selected workstation out of the plurality of workstations.

* * * * *